(12) United States Patent
Tohriyama et al.

(10) Patent No.: US 11,131,552 B2
(45) Date of Patent: Sep. 28, 2021

(54) MAP GENERATION SYSTEM

(71) Applicants: TOYOTA JIDOSHA KABUSHIKI KAISHA, Toyota (JP); THE UNIVERSITY OF TOKYO, Tokyo (JP)

(72) Inventors: Kyoichi Tohriyama, Yokohama (JP); Minoru Kamata, Tokyo (JP); Takuma Ito, Tokyo (JP); Satoshi Nakamura, Tokyo (JP)

(73) Assignees: TOYOTA JIDOSHA KABUSHIKI KAISHA, Toyota (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 16/705,682

(22) Filed: Dec. 6, 2019

(65) Prior Publication Data
US 2020/0182630 A1 Jun. 11, 2020

(30) Foreign Application Priority Data
Dec. 10, 2018 (JP) .............................. JP2018-231019

(51) Int. Cl.
*G01C 21/32* (2006.01)
(52) U.S. Cl.
CPC .................... *G01C 21/32* (2013.01)
(58) Field of Classification Search
None
See application file for complete search history.

(56) References Cited

U.S. PATENT DOCUMENTS

| 9,448,074 | B2 * | 9/2016 | Mizuno | G01C 21/32 |
|---|---|---|---|---|
| 9,738,279 | B2 * | 8/2017 | Eichhorn | B60W 30/095 |
| 2010/0305850 | A1 * | 12/2010 | Krumm | G01C 21/32 |
| | | | | 701/532 |
| 2011/0218724 | A1 * | 9/2011 | Iida | G01C 21/32 |
| | | | | 701/70 |

(Continued)

FOREIGN PATENT DOCUMENTS

JP      2013-168016 A     8/2013

*Primary Examiner* — Jelani A Smith
*Assistant Examiner* — Alexander C. Bost
(74) *Attorney, Agent, or Firm* — Sughrue Mion, PLLC (57) ABSTRACT

A map generation system includes a server configured to: transfer reference curved road constituent points onto a measurement target curved road as virtual constituent points arranged along the measurement target curved road adjacent to the reference curved road; acquire virtual trajectory curvature information based on positions of the virtual constituent points; acquire detailed curve information of the measurement target curved road by acquiring, based on a position of a start point of the measurement target curved road preset in the road map information, travel information of a vehicle traveling on the measurement target curved road, and the virtual trajectory curvature information, measurement target curved road constituent points arranged at preset intervals from the start point along the measurement target curved road, and associating the virtual trajectory curvature information with each of the measurement target curved road constituent points; and generate a map by acquiring the second detailed curve information.

4 Claims, 9 Drawing Sheets

(56) References Cited

U.S. PATENT DOCUMENTS

| | | | | |
|---|---|---|---|---|
| 2012/0095682 | A1* | 4/2012 | Wilson | B60W 40/10 |
| | | | | 701/532 |
| 2013/0080019 | A1* | 3/2013 | Isaji | B60W 30/18145 |
| | | | | 701/96 |
| 2014/0249716 | A1* | 9/2014 | Dorum | G06T 15/20 |
| | | | | 701/36 |
| 2015/0316386 | A1* | 11/2015 | Delp | G01C 21/3658 |
| | | | | 701/532 |
| 2016/0039413 | A1* | 2/2016 | Eichhorn | G01C 21/3407 |
| | | | | 701/26 |
| 2018/0217612 | A1* | 8/2018 | Vladimerou | G01C 21/32 |
| 2019/0025063 | A1* | 1/2019 | Eigel | B60W 30/10 |
| 2019/0113925 | A1* | 4/2019 | Sim | B60W 30/18163 |
| 2019/0196472 | A1* | 6/2019 | Korner | G01C 21/32 |
| 2019/0360819 | A1* | 11/2019 | Mao | G01C 21/362 |
| 2019/0391594 | A1* | 12/2019 | Takano | B60W 40/10 |
| 2020/0122721 | A1* | 4/2020 | Zhang | B60W 60/0027 |
| 2020/0124424 | A1* | 4/2020 | Shibahata | B60W 10/22 |
| 2020/0139959 | A1* | 5/2020 | Akella | G01C 21/3446 |
| 2020/0141738 | A1* | 5/2020 | Dorum | G01C 21/3492 |
| 2020/0166364 | A1* | 5/2020 | Fujita | G01S 19/14 |
| 2020/0225044 | A1* | 7/2020 | Tohriyama | G05D 1/0212 |
| 2020/0348146 | A1* | 11/2020 | Yokota | B60W 50/0097 |

* cited by examiner

MAP GENERATION SYSTEM

INCORPORATION BY REFERENCE

The disclosure of Japanese Patent Application No. 2018-231019 filed on Dec. 10, 2018 including the specification, drawings and abstract is incorporated herein by reference in its entirety.

BACKGROUND

1. Technical Field

The disclosure relates to a map generation system.

2. Description of Related Art

In the related art, as a technique related to a map generation system, there is known a technique in which a straight road of a target road section where the present vehicle is not actually traveling is estimated based on trajectory information indicating the traveling trajectories of a plurality of other vehicles on the straight road (see, e.g., Japanese Unexamined Patent Application Publication No. 2013-168016).

SUMMARY

However, in the related art, acquisition of detailed curve information may not be coped with sufficiently.

An aspect of the disclosure provides a map generation system. The map generation system according to the aspect includes a server configured to: transfer a plurality of reference curved road constituent points, the reference curved road constituent points being preset in road map information such that the reference curved road constituent points are arranged along a reference curved road, and the reference curved road constituent points being associated with shape information of the reference curved road, onto a measurement target curved road as a plurality of virtual constituent points arranged along the measurement target curved road adjacent to the reference curved road, the road map information including first detailed curve information including the shape information of the reference curved road; acquire virtual trajectory curvature information, the virtual trajectory curvature information being curvature information of a virtual trajectory extending along the measurement target curved road and set the virtual trajectory, based on positions of the plurality of virtual constituent points and the shape information of the reference curved road constituent points respectively corresponding to the plurality of virtual constituent points; acquire second detailed curve information of the measurement target curved road by acquiring, based on a position of a start point of the measurement target curved road preset in the road map information, travel information of a vehicle traveling on the measurement target curved road, and the virtual trajectory curvature information, a plurality of measurement target curved road constituent points arranged at preset intervals from the start point along the measurement target curved road, and associating the virtual trajectory curvature information with each of the plurality of measurement target curved road constituent points; and generate a map by acquiring the second detailed curve information.

With the above configuration, the shape information of the reference curved road included in the road map information as the detailed curve information can be used to acquire the detailed curve information of the measurement target curved road. As a result, it is possible to appropriately acquire the detailed curve information of the measurement target curved road adjacent to the reference curved road.

In the above aspect of the disclosure, the server may be configured to: transfer the reference curved road constituent points as the virtual constituent points onto the measurement target curved road so as to cross a lane mark dividing the reference curved road and the measurement target curved road; acquire a position of a curvature center of the virtual trajectory by calculating an intersection of i) a straight line passing through a first virtual constituent point included in the virtual constituent points and a first reference curved road constituent point included in the reference curved road constituent points, the first reference curved road constituent point corresponding to the first virtual constituent point, and ii) a straight line passing through a second virtual constituent point included in the virtual constituent points and adjacent to the first virtual constituent point on the measurement target curved road and a second reference curved road constituent point corresponding to the second virtual constituent point, the second reference curved road constituent point being included in the reference curved road constituent points; and acquire the virtual trajectory curvature information using a curvature radius that is a distance from the curvature center to adjacent virtual constituent points. In this case, for example, it is possible to acquire the virtual trajectory curvature information using the curvature radius of the arc passing through the adjacent virtual constituent points on the measurement target curved road.

In the above aspect of the disclosure, the server may be configured to: estimate a position of a center line in a lane width direction of the measurement target curved road based on a captured image of a camera provided in the vehicle traveling on the measurement target curved road; and reset the plurality of measurement target curved road constituent points on the center line. In this case, it is possible to more appropriately acquire the detailed curve information of the measurement target curved road.

As described above, according to various aspects and embodiments of the disclosure, it is possible to appropriately acquire detailed curve information on a measurement target curved road adjacent to a reference curved road.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments will be described with reference to the drawings.

Configuration of Map Generation System

Figure 1:
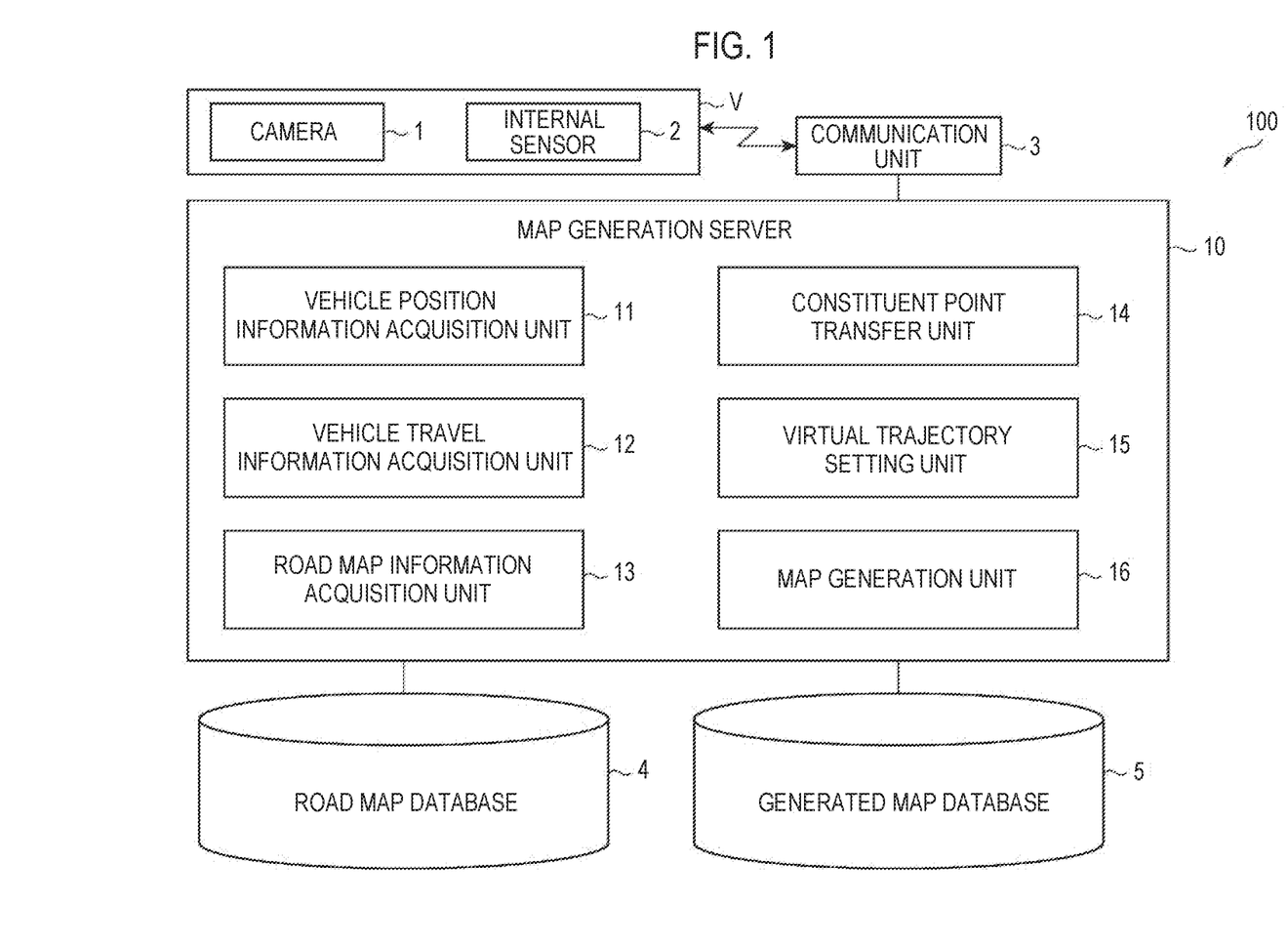
FIG. 1 is a block diagram showing a map generation system according to one embodiment.

FIG. 1 is a block diagram showing a map generation system according to one embodiment. As shown in FIG. 1, the map generation system 100 is provided, for example, at a center that manages traffic information. The map generation system 100 collects various data, such as travel information of a vehicle V, by communication with the vehicle V and generates a map using the collected data.

The vehicle V is, for example, a vehicle having a function of making communication with the map generation system 100. The vehicle V includes, for example, at least devices such as a camera 1, an internal sensor 2 and a GPS receiving unit (not shown). The vehicle V may be a general vehicle including general-purpose devices. The vehicle V is not limited to a general vehicle and may be a vehicle for information collection (so-called probe car) including devices having higher performance than general-purpose devices.

The camera 1 is an imaging device that is mounted on the vehicle V to capture an image of an external environment of the vehicle V. The camera 1 is provided, for example, on a back side of a windshield of the vehicle V or the like. The camera 1 may be a monocular camera or a stereo camera. The stereo camera includes two imaging units arranged to reproduce binocular parallax. The external environment of the vehicle V includes a situation of a road on which the vehicle V travels.

The internal sensor 2 is an on-vehicle sensor that detects a traveling state of the vehicle V. The internal sensor 2 includes a vehicle speed sensor, an acceleration sensor and a yaw rate sensor. The vehicle speed sensor is a detector that detects the speed of the vehicle V. As the vehicle speed sensor, for example, a wheel speed sensor provided to a wheel of the vehicle V or a drive shaft rotating integrally with the wheel or the like and configured to detect a rotational speed of the wheel is used. The acceleration sensor is a detector that detects the acceleration of the vehicle V. The acceleration sensor includes, for example, a longitudinal acceleration sensor that detects a longitudinal acceleration of the vehicle V, and a lateral acceleration sensor that detects a lateral acceleration of the vehicle V. The yaw rate sensor is a detector that detects a yaw rate (rotational angular velocity) around a vertical axis of a gravity center of the vehicle V. For example, a gyro sensor may be used as the yaw rate sensor.

The GPS receiving unit measures the position of the vehicle V (for example, a latitude and a longitude of the vehicle V) by receiving signals from three or more GPS satellites.

Next, the configuration of the map generation system 100 will be described. As shown in FIG. 1, the map generation system 100 includes a map generation server 10. The map generation server 10 is configured as a general computer including a Central Processing Unit (CPU), a storage unit, a communication control unit, and the like. The storage unit may be a memory in the map generation server 10 directly accessible by the CPU, or may be a storage medium, such as a Hard Disk Drive (HDD) or the like. The storage unit may be provided outside the map generation server 10. The communication control unit is, for example, a communication device, such as a network card that controls communication. The map generation server 10 may be constituted by a plurality of computers, or may be a cloud server.

The map generation server 10 is connected to a communication unit 3, a road map database 4 and a generated map database 5. The communication unit 3 is a wireless communication facility for communicating with the vehicle V. The communication unit 3 may be a communication facility of the center where the map generation server 10 is provided.

The road map database 4 is a database for storing road map information. The road map database 4 may constitute a part of the map generation server 10, or may be provided in a facility different from the map generation server 10. The road map information includes link information of roads.

The link information is information on a link and a node preset on a map and is, for example, information usable for car navigation. The node is a road section corresponding to an intersection on a modeled road. The link is a road segment between two adjacent nodes. In the following description, when the link between two adjacent nodes is a curved or bent road, each lane in the link is referred to as a "curved road."

The road map information includes position information on a plurality of curved road constituent points. The curved road constituent points are points on a curved road for indicating a lane form of a curved road. A plurality of curved road constituent points is set in advance along the curved road in the road map information. The curved road constituent points are set to be arranged along the curved road at preset intervals from a start point. The start point of the curved road may be an end portion closer to the link in the node closer to the start point among the nodes adjacent to the link corresponding to the curved road. The preset intervals are generally not equal intervals, but may be equal intervals.

Figure 2:
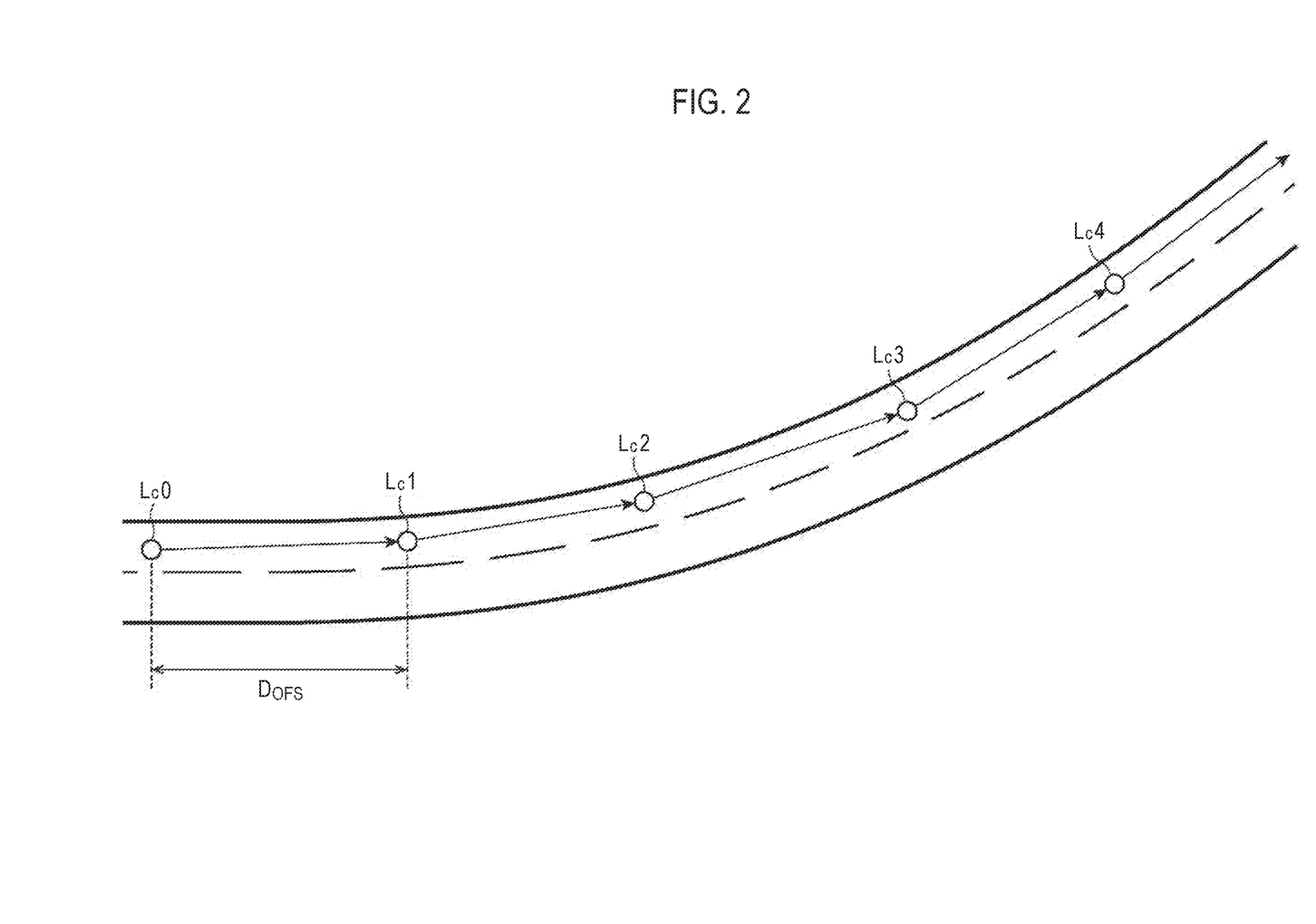
FIG. 2 is a diagram for explaining road map information on a curved road.

The position information of the curved road constituent points includes information on the position of the start point of the curved road preset in the road map information and information on an offset amount from the start point. The offset amount means the distance from the start point of the curved road to the curved road constituent point. The offset amount may be calculated in advance, for example, based on an actual travel distance of the vehicle traveling on the curved road. The position of the curved road constituent point may be specified, for example, as a point at which the distance from the start point of the curved road is equal to a predetermined offset amount. For example, as shown in FIG. 2, the curved road constituent point Lc1 may be specified as a point at which the distance from the start point Lc0 of the curved road is equal to the offset amount Dix's. The curved road constituent points Lc2 to Lc4 may be specified in a similar manner. Thus, the road map information in the present disclosure is configured to include so-called LeanMap information.

Furthermore, the position of the curved road constituent point may be specified, for example, by a coordinate position of a predetermined orthogonal coordinate system. The predetermined coordinate system may be, for example, an orthogonal coordinate system in which the position of the vehicle V on the map at the start of traveling of the vehicle V is an origin, the traveling direction at that time is an x axis, and the horizontal direction orthogonal to the traveling direction is a y axis.

The road map information may include information on the lane width of the road. The lane width means the width of each lane corresponding to each curved road. The lane width may be a distance between lane marks that divide the curved road, or a distance between the lane mark that divides the curved road and the road surface end of the curved road. The road surface end means an edge of the road surface in a lane width direction of the curved road, and may be, for example, an edge of the road surface itself or a boundary line between the road surface and a curb. In the road map information, identification information, such as an identification number or the like may be assigned to each node, each link, each curved road and each curved road constituent point.

The road map information includes detailed curve information. The detailed curve information means information for representing the lane shape of the curved road with such an accuracy that can be used for vehicle control, such as autonomous driving control of the vehicle V or the like. The detailed curve information includes, for each curved road, shape information of the curved road at the position of each of the curved road constituent points. The shape information referred to herein includes information on the position of each curved road constituent point on each curved road, and information on the azimuth angle of each curved road constituent point on each curved road. The azimuth angle refers to an angle formed by a straight line that connects the curved road constituent point and one curved road constituent point adjacent to the curved road constituent point, and a straight line that connects the curved road constituent point and another curved road constituent point adjacent to the curved road constituent point. The azimuth angle may be, for example, an angle formed by a direction of a tangent at the curved road constituent point of a predetermined arc passing through the curved road constituent point and a direction of an axis of a predetermined orthogonal coordinate system. In the road map information, the shape information of the curved road is associated with each of the curved road constituent points.

The generated map database 5 is a database that stores information on a generated map generated by the map generation server 10. The generated map database 5 accumulates, as the information on the generated map, the information for acquiring detailed curve information of a measurement target curved road that will be described later. The generated map database 5 may constitute a part of the map generation server 10 or may be provided in a facility different from the map generation server 10. The generated map database 5 may be physically integrated with the road map database 4 or may be configured separately from the road map database 4.

In addition, for example, as a result of accumulating the information of the generated map in the generated map database 5, when the detailed curve information of the measurement target curved road has a certain accuracy or more, the detailed curve information of the measurement target curved road is stored in the road map database 4 as fixed data (FIX data). The information on the fixed data of the generated map stored in the road map database 4 is used for, for example, vehicle control such as autonomous driving control of the vehicle V or the like. The vehicle control may include various kinds of driving support control, such as Adaptive Cruise Control (ACC), Lane Keeping Assist (LKA) and the like, and vehicle control.

The map generation system 100 configured as described above generates a map by acquiring detailed curve information of a measurement target curved road adjacent to a reference curved road based on the road map information of the road map database 4 through the use of detailed curve information (shape information) of the reference curved road whose the detailed curve information is included in the road map information.

The reference curved road means a curved road serving as a reference for generating a map. On the reference curved road, deepening of road map information is advanced previously by the existing method. The deepening of the road map information referred to herein means improving (refining) an accuracy of the road map information of the curved road based on travel information of a vehicle V traveling on a certain curved road and the road map information of the road map database 4. The deepening of the road map information referred to herein includes, for example, updating an azimuth angle of each curved road constituent point of the curved road using the curvature radius obtained by dividing a vehicle speed acquired as the travel information of the vehicle V traveling on a certain curved road multiple times by a yaw rate. The reference curved road may be selected according to an operation of the map generation server 10 by an operator based on, for example, a state of deepening of the road map information, or may be automatically selected in the map generation process of the map generation server 10.

The measurement target curved road is a curved road as a target of map generation and is a curved road adjacent to the reference curved road. The measurement target curved road may be the opposite lane of the reference curved road, or may be a parallel lane of the reference curved road. In the present disclosure, the road map information of the measurement target curved road is not deepened in advance unlike the case of the reference curved road. In the present disclosure, it is intended to appropriately refine the road map information of the measurement target curved road while using the road map information (shape information) of the reference curved road that has been deepened in advance.

Configuration of Map Generation Server

Next, the functional configuration of the map generation server 10 will be described. As shown in FIG. 1, the map generation server 10 includes a vehicle position information acquisition unit 11, a vehicle travel information acquisition unit 12, a road map information acquisition unit 13, a constituent point transfer unit 14, a virtual trajectory setting unit 15 and a map generation unit 16. A part of the functions of the map generation server 10 described below may be realized by an Electronic Control Unit (ECU) mounted on the vehicle V.

The vehicle position information acquisition unit 11 acquires position information of the vehicle V based on the data collected by communicating with the vehicle V via the communication unit 3. The position information includes, for example, information on a position on the map of the vehicle V (a vehicle position on the LeanMap) specified based on an actual travel distance of the vehicle V, starting from a position (measurement position) on the map of the vehicle V measured by the GPS receiving unit. The measurement position may be corrected by so-called odometry based on detection result of the internal sensor 2 of the vehicle V. The vehicle position information acquisition unit 11 acquires the vehicle position of the vehicle V on the LeanMap of the vehicle V that has traveled the measurement target curved road, for example, according to the operation of the map generation server 10 performed by an operator.

The vehicle travel information acquisition unit 12 acquires the travel information of the vehicle V based on the data collected by communicating with the vehicle V via the communication unit 3. The travel information is the information on the travel state of the vehicle V used for map generation in the map generation server 10. The travel information includes, for example, various data (so-called travel log), such as a vehicle speed, an acceleration, and a yaw rate of the vehicle V acquired by the internal sensor 2 of the vehicle V.

The road map information acquisition unit 13 acquires the shape information of the reference curved road as the road map information. The road map information acquisition unit 13 acquires, as the shape information of the reference curved road, the position information of the reference curved road constituent points and the information of azimuth angles at the reference curved road constituent points. The reference curved road constituent points are a plurality of curves road constituent points arranged along the reference curved road. In the road map information, the plurality of reference curved road constituent points and the shape information of the reference curved road are associated with each other.

Figure 3:
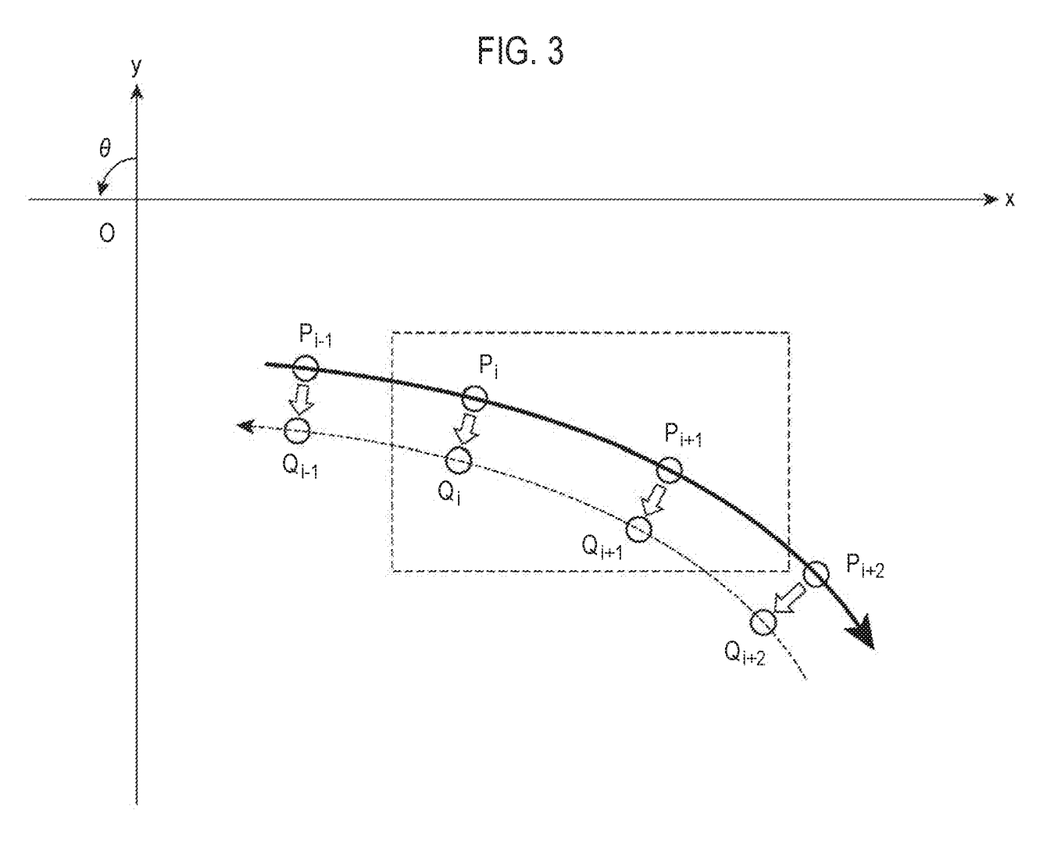
FIG. 3 is a diagram showing reference curved road constituent points.
Figure 4:
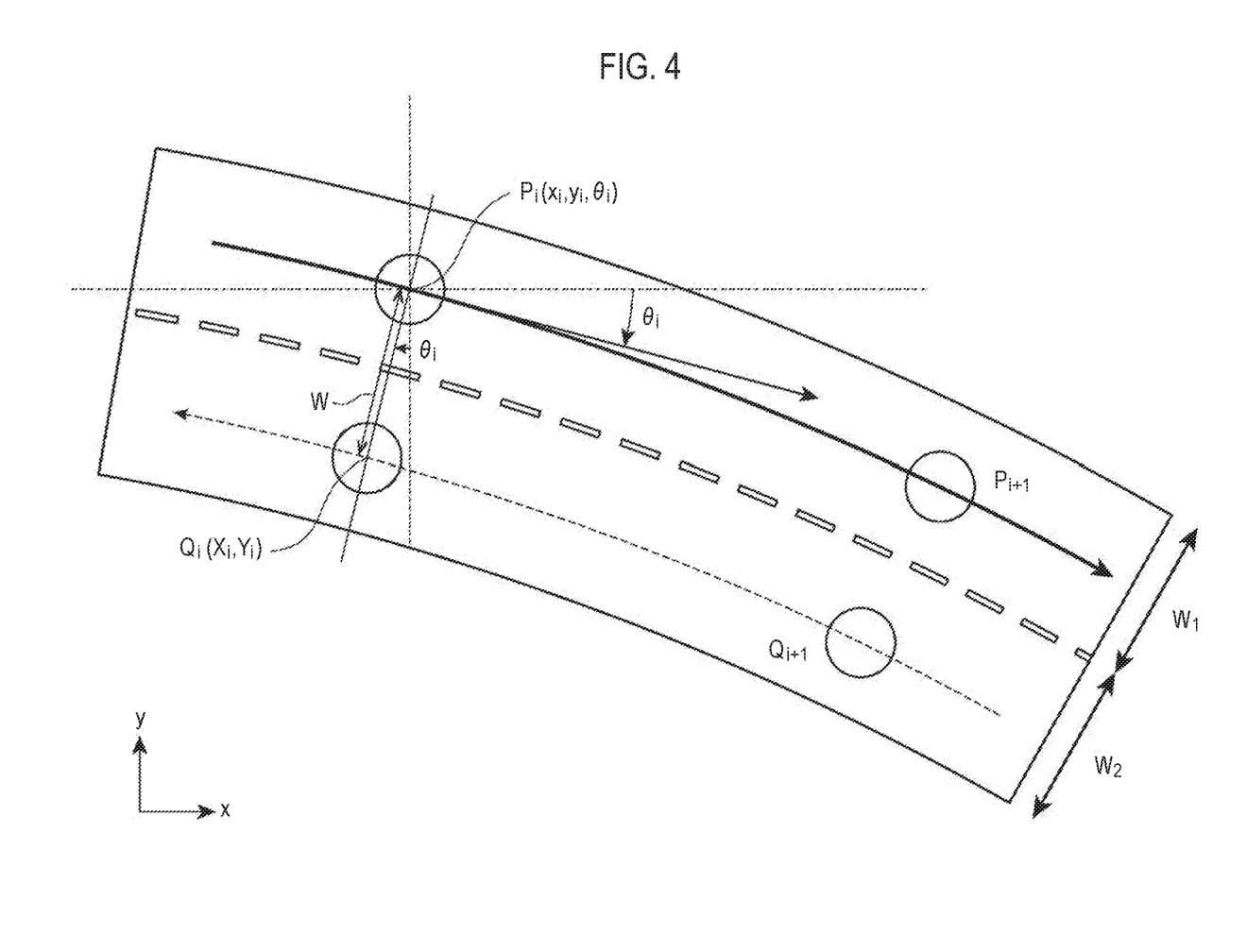
FIG. 4 is an enlarged view showing a broken-line frame in FIG. 3 superimposed on a reference curved road and a measurement target curved road.

FIG. 3 is a diagram showing reference curved road constituent points. FIG. 4 is an enlarged view showing a broken-line frame in FIG. 3 superimposed on a reference curved road and a measurement target curved road. In FIGS. 3 and 4, as an example, the reference curved road is indicated by a solid-line arrow extending in an arc shape in a predetermined orthogonal coordinate system xy. The measurement target curved road is indicated by a broken-line arrow extending in an arc shape.

As shown in FIG. 3, reference curved road constituent points $P_{i-1}$, $P_i$, $P_{i+i}$ and $P_{i+2}$ are arranged on the reference curved road. As shown in FIG. 4, the position of a reference curved road constituent point $P_i$ is represented by, for example, coordinates $(x_i, y_i)$. The azimuth angle of the reference curved road constituent point $P_i$ is represented by an azimuth angle $\theta_i$. In this case, the shape information of the reference curved road may be represented by, for example, $(x_i, y_i, \theta_i)$. In the example of FIG. 4, the road map information acquisition unit 13 acquires the coordinates $(x_i, y_i)$ of the position of the reference curved road constituent point $P_i$ and the azimuth angle $\theta_i$ at the reference curved road constituent point $P_i$.

The road map information acquisition unit 13 acquires, as the road map information, a lane width $W_i$ of the reference curved road and a lane width $W_2$ of the measurement target curved road (see FIG. 4). The road map information acquisition unit 13 may acquire, for example, the lane width of the curved road stored in advance as the road map information in the road map database 4, or may acquire the lane width of the curved road on which the vehicle V travels, based on the captured image of the camera 1 of the vehicle V.

In addition, the road map information acquisition unit 13 acquires, as the road map information, the positions of the measurement target curved road constituent points of the measurement target curved road based on the vehicle position on the LeanMap of the vehicle V that has traveled the measurement target curved road. The measurement target curved road constituent points are a plurality of curved road constituent points arranged along the measurement target curved road.

The constituent point transfer unit 14 transfers a plurality of reference curved road constituent points to the measurement target curved road as a plurality of virtual constituent points arranged along the measurement target curved road, based on the position information of the reference curved road constituent points and the information of the azimuth angles at the reference curved road constituent points (transfer of the shape information of the reference curved road). The virtual constituent points mean a plurality of virtual points on the measurement target curved road, which are set to acquire the detailed curve information of the measurement target curved road. The transfer referred to herein means specifying positions of the virtual constituent points on the measurement target curved road adjacent to the reference curved road based on the positions and the azimuth angles of the reference curved road constituent points on the known reference curved road.

The constituent point transfer unit 14 transfers the reference curved road constituent point $P_i$ as a virtual constituent point $Q_i$ onto the measurement target curved road so as to cross the lane mark that divides the reference curved road and the measurement target curved road. Specifically, for example, as shown in FIG. 4, the constituent point transfer unit 14 transfers the reference curved road constituent point $P_i$ as the virtual constituent point $Q_i$ onto the measurement target curved road by calculating a coordinate $(X_i, Y_i)$ of a virtual constituent point $Q_i$ according to the following equations (1) to (3) using a coordinate $(x_i, y_i)$ of a reference curved road constituent point $P_i$ and an azimuth angle $\theta_i$ at the reference curved road constituent point $P_i$. The constituent point transfer unit 14 transfers the reference curved road constituent point $P_i$ for all the target integers i (i=1, 2, 3, . . . , n).

$$X_i = x_i + W \cos(\theta_i - \pi/2) \tag{1}$$

$$Y_i = y_i + W \sin(\theta_i - \pi/2) \tag{2}$$

$$W = (W_1 + W_2)/2 \tag{3}$$

The virtual trajectory setting unit 15 acquires virtual trajectory curvature trajectory, based on the positions of the plurality of virtual constituent points $Q_i$ and the shape information of the reference curved road associated with the reference curved road constituent points $P_i$ corresponding to the plurality of virtual constituent points $Q_i$. The virtual trajectory is a virtual arc-like trajectory extending along a measurement target curved road so as to pass through a plurality of transferred virtual constituent points. The virtual trajectory is temporarily set in order to use the shape information of the reference curved road on the measurement target curved road.

Figure 5:
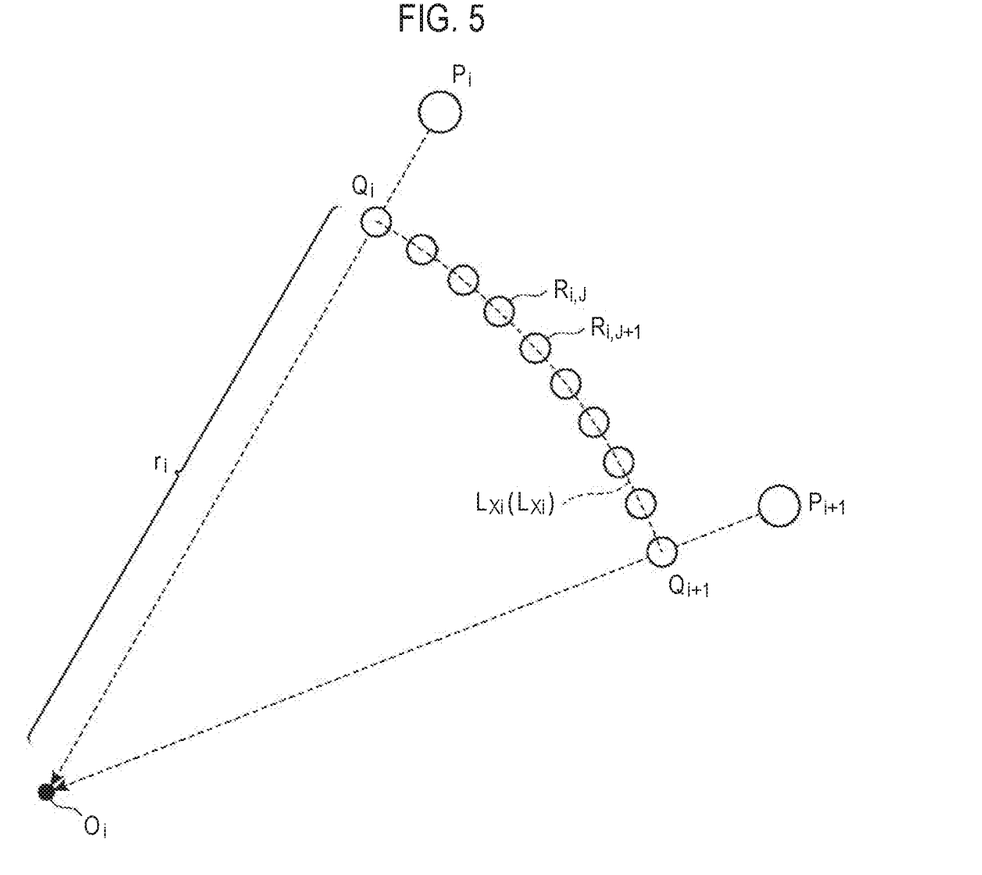
FIG. 5 is a diagram for explaining a setting of a virtual trajectory.

For example, as shown in FIG. 5, the virtual trajectory setting unit 15 acquires a position of a curvature center $O_i$ of a partial virtual trajectory $L_{xi}$ by finding an intersection of a straight line $P_iQ_i$ and a straight line $P_{i+1}Q_{i+1}$ based on the positions of the virtual constituent points $Q_i$, $Q_{i+1}$ adjacent to each other and the positions of the reference curved road constituent points $P_i$, $P_{i+1}$ corresponding to the virtual constituent points $Q_i$, respectively. The virtual trajectory setting unit 15 acquires, as the virtual trajectory curvature information, a curvature radius $r_i$ that is a distance from the curvature center $O_i$ to the virtual constituent points $Q_i$, $Q_{i+1}$. That is, the shape of the reference curved road is transferred to the measurement target curved road using the shape information of the reference curved road so as to obtain virtual constituent points $Q_i$, $Q_{i+1}$, and the virtual trajectory curvature information is geometrically calculated using the positions of virtual constituent points $Q_i$, $Q_{i+1}$ (reduction of the virtual trajectory to the curvature). The azimuth angle used to calculate the virtual trajectory curvature information may be the azimuth angle $\theta_{i+1}$ at the reference curved road constituent point $P_{i+1}$.

The virtual trajectory setting unit 15 sets an arc whose center is the position of the curvature center $O_i$ and whose radius is the curvature radius $r_i$. The virtual trajectory setting unit 15 sets a partial virtual trajectory $L_{xi}$ passing through the positions of the virtual constituent points $Q_i$, $Q_{i+1}$ by setting virtual waypoints $R_{i,j}$ on the arc. The virtual waypoints are arranged at predetermined intervals (for example, 5 cm) so as to connect the virtual constituent points $Q_i$, $Q_{i+1}$. The virtual waypoints mean point groups on the map that form a trajectory along the measurement target curved road. The integer j may be appropriately set according to the distance between the virtual constituent points $Q_i$, $Q_{i+1}$.

The virtual trajectory setting unit 15 sets virtual waypoints $R_{i,j}$ so as to connect the virtual constituent points $Q_{i+1}$ with respect to all the target integers i, thereby setting a virtual trajectory $L_x$ passing through virtual constituent points $Q_i$ to $Q_n$. The virtual trajectory $L_x$ means a virtual trajectory by which partial virtual trajectories $L_{xi}$ are connected to one another for all target integers i. Since the azimuth angle $\theta_i$ at the reference curved road constituent point $P_i$ is used to specify the positions of the virtual constituent points $Q_i$, $Q_{i+1}$, it can be said that the virtual trajectory $L_x$ is based on the shape information of the reference curved road associated with the reference curved road constituent point $P_i$ corresponding to each of the plurality of virtual constituent points $Q_i$.

The map generation unit 16 acquires a position of a start point of the measurement target curved road based on the vehicle position on the LeanMap of the vehicle V traveling on the measurement target curved road and the road map information of the road map database 4. In addition, the map generation unit 16 acquires the actual travel distance of the vehicle V from the start point along the measurement target curved road based on the travel information of the vehicle V traveling on the measurement target curved road.

The map generation unit 16 acquires detailed curve information of the measurement target curved road by associating the virtual trajectory curvature information with each of a plurality of measurement target curved road constituent points arranged at preset intervals from the start point along the measurement target curved road, based on the position of the start point of the measurement target curved road set in advance, the travel information of the vehicle V (here, the actual travel distance of the vehicle V from the start point along the measurement target curved road), and the virtual trajectory curvature information of the set virtual trajectory. In this regard, the map generation unit 16 associates the curvature radius $r_i$ of the partial virtual trajectory $L_{xi}$ acquired by the virtual trajectory setting unit 15 with the measurement target curved road constituent point located between the virtual constituent points $Q_i$, $Q_{i+1}$, based on the position of the measurement target curved road constituent point acquired by the road map information acquisition unit 13. The map generation unit 16 acquires the detailed curve information of the measurement target curved road by performing this association on all the target integers i.

The position of the virtual constituent point $Q_i$ does not necessarily overlap with the measurement target curved road constituent point. Therefore, even if the position of the virtual constituent point $Q_i$ is different from the position of the measurement target curved road constituent point, it is possible to appropriately acquire the detailed curve information of the measurement target curved road by, as in the present disclosure, temporarily setting the virtual trajectory $L_{xi}$ and associating the virtual trajectory curvature information between the virtual constituent points $Q_i$, $Q_{i+1}$ with the measurement target curved road constituent point located between the virtual constituent points $Q_i$, $Q_{i+1}$ for all the target integers i.

Furthermore, the map generation unit 16 may estimate the position in the lane width direction of the center line of the measurement target curved road based on the captured image of the camera 1 provided in the vehicle V traveling on the measurement point target curved road, and may reset a plurality of measurement target curved road constituent points on the center line. The map generation unit 16 performs estimation of the position of the center line and the resetting of the measurement target curved road constituent points on the center line by an existing method based on, for example, the captured image of the camera 1. Therefore, not only in the direction along the measurement target curved road but also in the width direction of the measurement target curved road, it is possible to enhance the accuracy of the detailed curve information of the measurement target curved road using the actual traveling data of the vehicle V traveling on the measurement target curved road. In addition, the map generation unit 16 may further deepen the road map information of the measurement target curved road in the same manner as the method of deepening the road map information.

When the curvature radius $r_i$ of the virtual trajectory $L_{xi}$ is associated with the measurement target curved road constituent point, the map generation unit 16 stores the virtual waypoint $R_{i,j}$ in the generated map database 5 as information of a generated map. As a result of accumulating the information of the generated map stored in the generated map database 5 (in particular, as a result of deepening the road map information of the measurement target curved road), when the detailed curve information of the measurement target curved road has an accuracy equal to or higher than a certain accuracy that can be used for vehicle control, such as autonomous driving control of the vehicle V or the like, the map generation unit 16 stores the detailed curve information of the measurement target curved road in the road map database 4 as fixed data.

[One Example of Process Performed by Map Generation System 100]

Next, the process performed by the map generation system 100 according to the present embodiment will be described with reference to FIGS. 6 to 9. The processes of FIGS. 6 to 9 are executed, for example, in response to the operation of the map generation server 10 by an operator.

Figure 6:
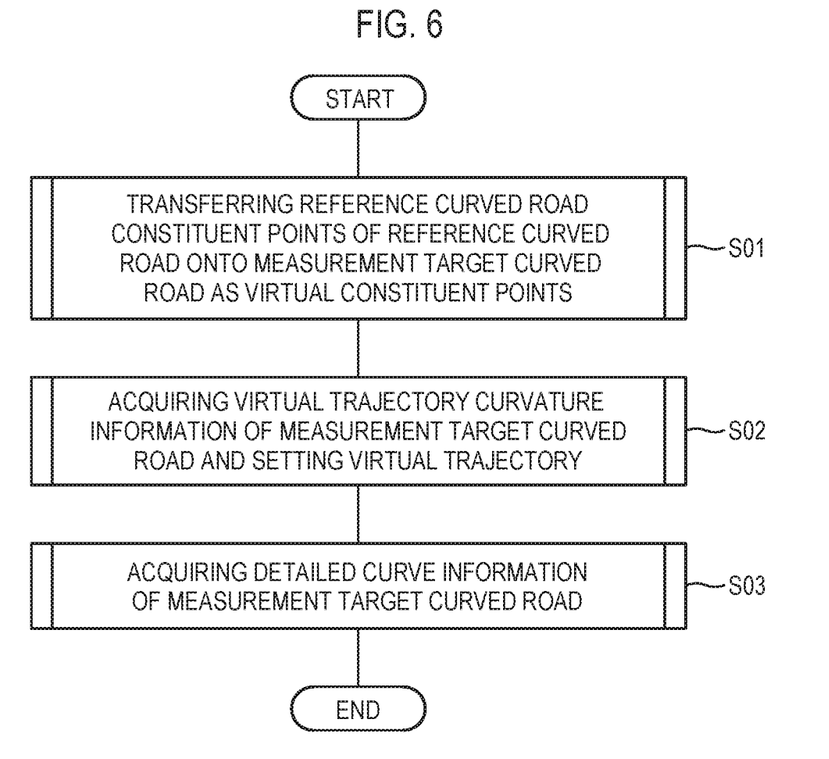
FIG. 6 is a flowchart showing a main process performed in the map generation system.

FIG. 6 is a flowchart showing a main process performed in the map generation system 100. As shown in FIG. 6, in the map generation server 10 of the map generation system 100, in S01 the road map information acquisition unit 13 and the constituent point transfer unit 14 transfer the reference curved road constituent points $P_i$ on the reference curved road to the measurement target curved road as virtual constituent points $Q_i$. Specifically, the map generation server 10 performs the process of FIG. 7 (details will be described later).

In S02, the map generation server 10 causes the virtual trajectory setting unit 15 to acquire virtual trajectory curvature information on the measurement target curved road and to set a virtual trajectory $L_{xi}$. Specifically, the map generation server 10 performs the process of FIG. 8 (details will be described later).

In S03, the map generation server 10 causes the map generation unit 16 to acquire detailed curve information of the measurement target curved road. Specifically, the map generation server 10 performs the process of FIG. 9 (details will be described later). Thereafter, the map generation server 10 terminates the process of FIG. 6.

Figure 7:
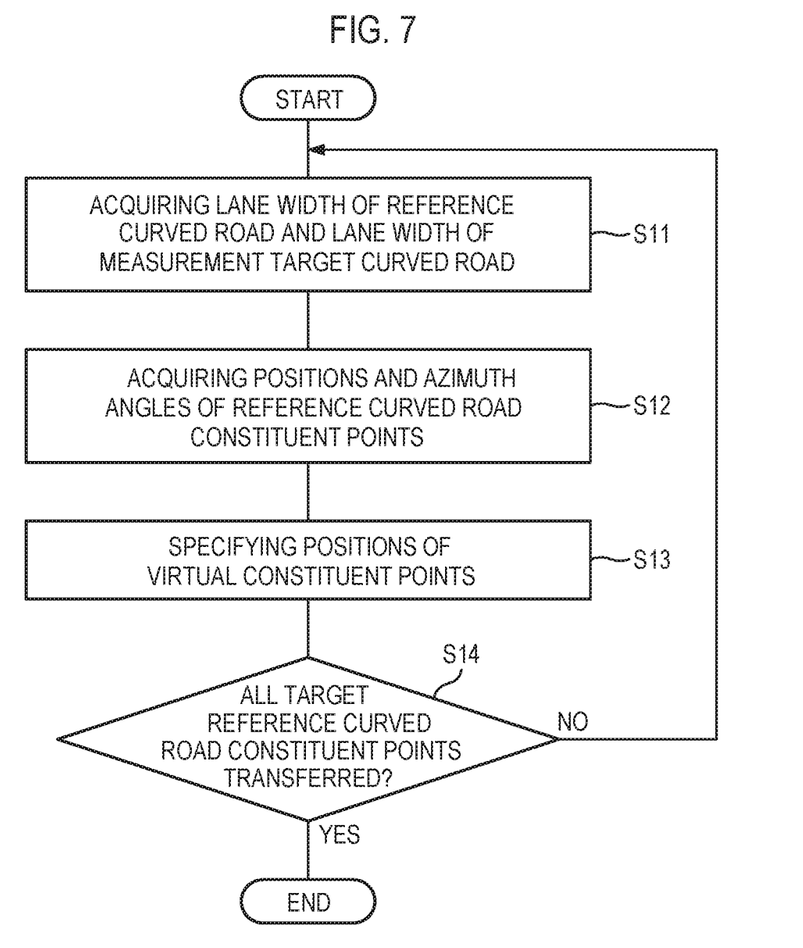
FIG. 7 is a flowchart showing a transfer process of a reference curved road constituent points.

FIG. 7 is a flowchart showing the transfer process of the reference curved road constituent points. As shown in FIG. 7, in S11, the map generation server 10 causes the road map information acquisition unit 13 to acquire the lane width $W_i$ of the reference curved road and the lane width $W_2$ of the measurement target curved road. The road map information acquisition unit 13 acquires, for example, the lane widths $W_i$, $W_2$ stored in advance in the road map database 4 as road map information.

In S12, the map generation server 10 causes the road map information acquisition unit 13 to acquire the position of the reference curved road constituent point $P_i$ and the azimuth angle $θ_i$. The road map information acquisition unit 13 acquires, for example, the position and the azimuth angle $θ_i$ of the reference curved road constituent point $P_i$ in response to the operation of the map generation server 10 by an operator.

In S13, the map generation server 10 causes the constituent point transfer unit 14 to specify the position of the virtual constituent point $Q_i$. For example, the constituent point transfer unit 14 calculates the coordinates $(X_i, Y_i)$ of the virtual constituent point $Q_i$ according to the above equations (1) to (3) using the coordinates $(x_i, y_i)$ of the reference curved road constituent point $P_i$ and the azimuth angle $θ_i$ at the reference curved road constituent point $P_i$, thereby specifying the position of the virtual constituent point $Q_i$. Thus, the reference curved road constituent point $P_i$ is transferred onto the measurement target curved road as the virtual constituent point $Q_i$.

In S14, the map generation server 10 causes the constituent point transfer unit 14 to determine whether all the target reference curved road constituent points $P_i$ have been transferred. For example, with respect to the reference curved road constituent points $P_i$ having an integer i of 1 or more and n or less, the constituent point transfer unit 14 determines whether the integer i has reached n.

If it is determined by the constituent point transfer unit 14 that the target reference curved road constituent points $P_i$ have not all been transferred (S14: NO), the map generation server 10 proceeds to S11 to continuously transfer the reference curved road constituent points $P_i$. On the other hand, when it is determined by the constituent point transfer unit 14 that the target reference curved road constituent points $P_i$ have all been transferred (S14: YES), the map generation server 10 terminates the process of transfer of the reference curved road constituent points shown in FIG. 7 and proceeds to S01 shown in FIG. 6.

Figure 8:
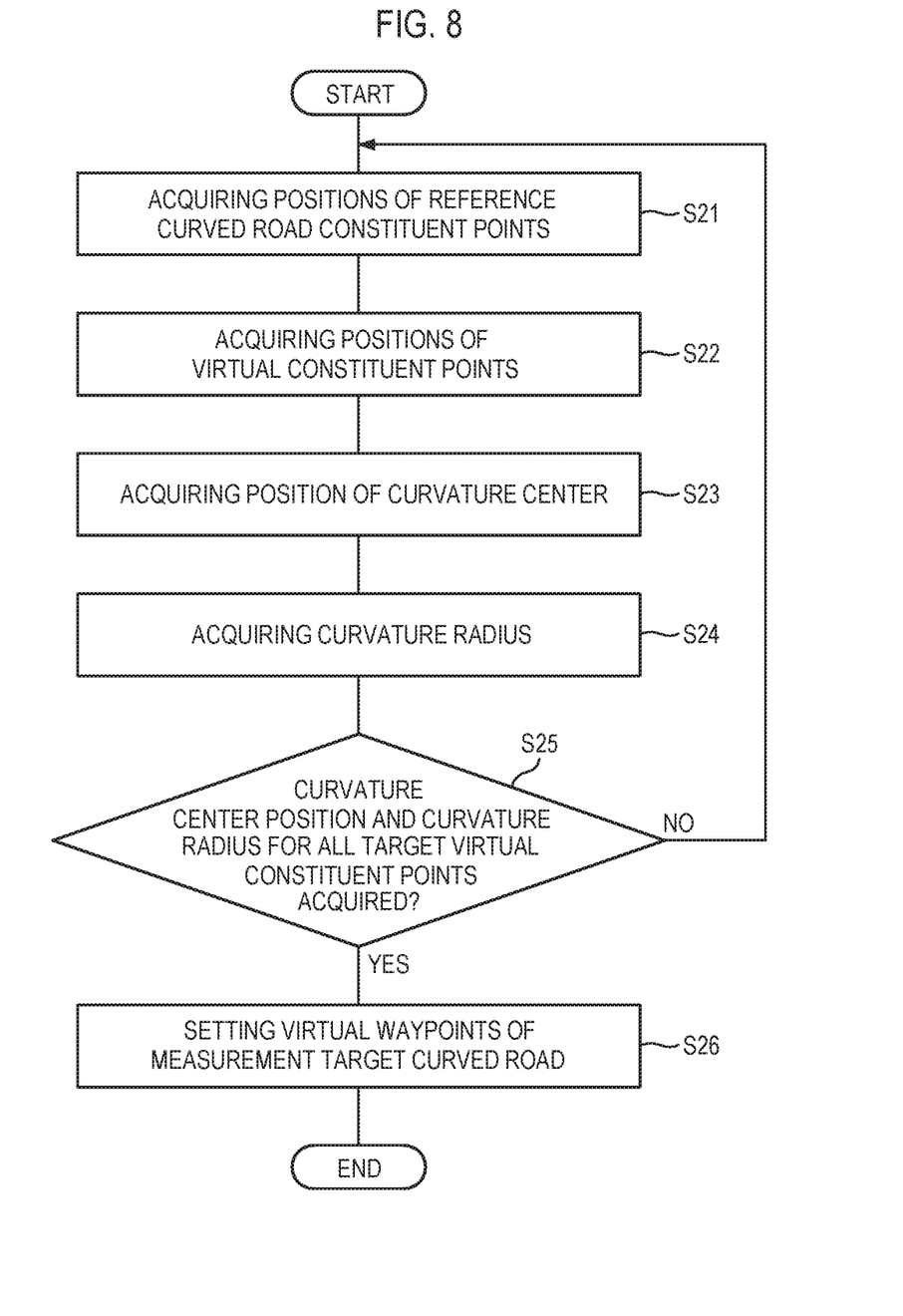
FIG. 8 is a flowchart showing a setting process of a virtual trajectory.

FIG. 8 is a flowchart showing a process of setting a virtual trajectory. As shown in FIG. 8, in S21, the map generation server 10 causes the road map information acquisition unit 13 to acquire the positions of the reference curved road constituent points $P_i$. For example, the road map information acquisition unit 13 acquires the positions of the reference curved road constituent points $P_i$ in response to the operation of the map generation server 10 by an operator.

In S22, the map generation server 10 causes the virtual trajectory setting unit 15 to acquire the position of the virtual constituent point $Q_i$. For example, the virtual trajectory setting unit 15 acquires the coordinates of the virtual constituent point $Q_i$ specified by the constituent point transfer unit 14 as the position of the virtual constituent point $Q_i$.

In S23, the map generation server 10 causes the virtual trajectory setting unit 15 to acquire the position of the curvature center $O_i$. For example, the virtual trajectory setting unit 15 acquires the position of the curvature center $O_i$ by finding a position of an intersection of a straight line $P_iQ_i$ and a straight line $P_{i+1}Q_{i+1}$ based on the positions of the virtual constituent points $Q_i$, $Q_{i+1}$ adjacent to each other and the positions of the reference curved road constituent points $P_i$, $P_{i+1}$ corresponding to the virtual constituent points $Q_i$, $Q_{i+1}$, respectively.

In S24, the map generation server 10 causes the virtual trajectory setting unit 15 to acquire the curvature radius $r_i$. For example, the virtual trajectory setting unit 15 acquires, as virtual trajectory curvature information, a curvature radius $r_i$ that is the distance from the curvature center $O_i$ to the virtual constituent points $Q_i$, $Q_{i+1}$.

In S25, the map generation server 10 causes the virtual trajectory setting unit 15 to determine whether the position of the curvature center $O_i$ and the curvature radius $r_i$ have been acquired with respect to all the target virtual constituent points $Q_i$. For example, with respect to the virtual constituent points $Q_i$ having an integer i of 1 or more and n or less, the virtual trajectory setting unit 15 determines whether the integer i has reached n.

If it is determined by the virtual trajectory setting unit 15 that the position of the curvature center $O_i$ and the curvature radius $r_i$ have not been acquired with respect to all the target virtual constituent points $Q_i$ (S25: NO), the map generation server 10 proceeds to S21 to continuously acquire the position of the curvature center $O_i$ and the curvature radius $r_i$.

On the other hand, when it is determined by the virtual trajectory setting unit 15 that the position of the curvature center $O_i$ and the curvature radius $r_i$ have been acquired with respect to all the target virtual constituent points $Q_i$ (S25: YES), in S26, the map generation server 10 causes the virtual trajectory setting unit 15 to set the virtual waypoint $R_{i,j}$ of the measurement target curved road. For example, the virtual trajectory setting unit 15 sets virtual waypoints $R_{i,j}$ at predetermined intervals with respect to all the target integers i so as to connect the virtual constituent points $Q_i$, $Q_{i+1}$ on an arc whose radius is the curvature radius $r_i$ with the position of the curvature center $O_i$ used as a center. Thus, a virtual trajectory $L_x$ having the virtual waypoints $R_{i,j}$ as point groups is set. Thereafter, the map generation server 10 terminates the setting process of the virtual trajectory shown in FIG. 8 and proceeds to S03 shown in FIG. 6.

Figure 9:
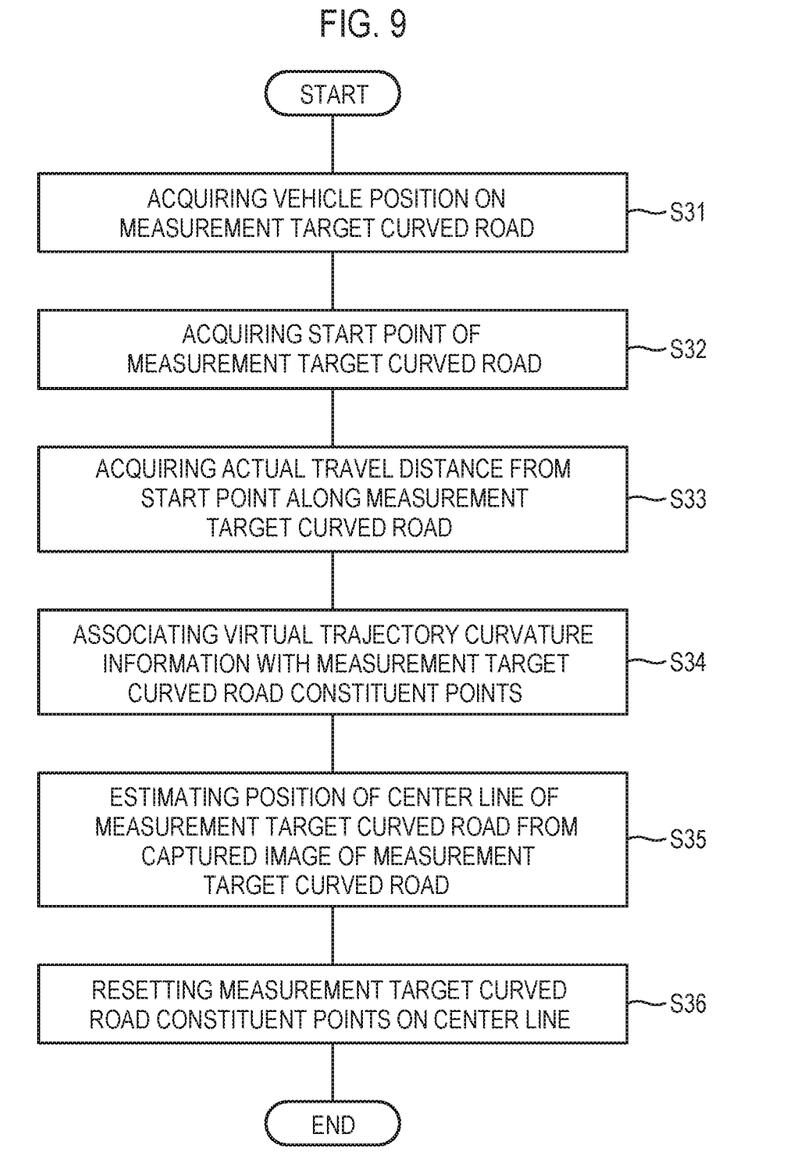
FIG. 9 is a flowchart showing a map generation process.

FIG. 9 is a flowchart showing a map generation process. As shown in FIG. 9, in S31, the map generation server 10 causes the vehicle position information acquisition unit 11 to acquire the position of the vehicle V on the measurement target curved road. For example, the vehicle position information acquisition unit 11 acquires the vehicle position on the LeanMap of the vehicle V on the measurement target curved road in response to the operation of the map generation server 10 by an operator based on the data collected by communicating with the vehicle V via the communication unit 3.

In S32, the map generation server 10 causes the map generation unit 16 to acquire the start point of the measurement target curved road. For example, the map generation unit 16 acquires the position of the start point of the measurement target curved road based on the vehicle position on the LeanMap of the vehicle V on the measurement target curved road and the road map information of the road map database 4.

In S33, the map generation server 10 causes the map generation unit 16 to acquire the actual travel distance of the vehicle V from the start point along the measurement target curved road. For example, the map generation unit 16 acquires the actual travel distance of the vehicle V from the start point along the measurement target curved road based on the travel information of the vehicle V traveling on the measurement target curved road.

In S34, the map generation server 10 causes the map generation unit 16 to associate the virtual trajectory curvature information with the measurement target curved road constituent point. For example, the map generation unit 16 associates the curvature radius $r_i$ as virtual trajectory curvature information with the measurement target curved road constituent point.

In S35, the map generation server 10 causes the map generation unit 16 to estimate the position of the center line of the measurement target curved road from the captured image on the measurement target curved road. In S36, the map generation server 10 causes the map generation unit 16 to reset the measurement target curved road constituent point on the center line. For example, the map generation unit 16 estimates the position of the center line by an existing method based on the captured image of the camera 1 and resets the measurement target curved road constituent point on the center line. Thereafter, the map generation server 10 terminates the map generation process shown in FIG. 9. In addition, when the detailed curve information of the measurement target curved road has a certain accuracy or more, in S04 of FIG. 6, the map generation server 10 causes the map generation unit 16 to store the detailed curve information of the measurement target curved road in the road map database 4 as fixed data.

[Operation and Effect of Map Generation System 100]

In the map generation system 100 described above, the plurality of reference curved road constituent points $P_i$ is transferred by the constituent point transfer unit 14 onto the measurement target curved road as the plurality of virtual constituent points $Q_i$ arranged along the measurement target curved road. Based on the positions of the plurality of virtual constituent points $Q_i$ and the shape information of the reference curved road associated with the reference curved road constituent points $P_i$ respectively corresponding to the plurality of virtual constituent points $Q_i$, the virtual trajectory curvature information of the virtual trajectory $L_x$ extending along the measurement target curved road is acquired and the virtual trajectory $L_x$ is set by the virtual trajectory setting unit 15. By thus transferring the plurality of reference curved road constituent points $P_i$ associated with the shape information of the reference curved road and acquiring the curvature information of the virtual trajectory $L_x$, the shape information of the reference curved road included in the road map information as the detailed curve information can be used to acquire the detailed curve information of the measurement target curved road. As a result, it is possible to appropriately acquire the detailed curve information of the measurement target curved road adjacent to the reference curved road. According to the map generation system 100, the number of travels of the vehicle V on the measurement target curved road necessary to make the detail curve information of the measurement target curved road have a certain accuracy or more can be reduced as compared with the case where the detailed curve information of the reference curved road is not used for the measurement target curved road.

In the map generation system 100, the constituent point transfer unit 14 transfers the reference curved road constituent point $P_i$ as the virtual constituent point $Q_i$ onto the measurement target curved road so as to cross the lane mark that divides the reference curved road and the measurement target curved road. The virtual trajectory setting unit 15 acquires the position of the curvature center $O_i$ of the partial virtual trajectory $L_{xi}$ by finding the intersection of the straight line $P_iQ_i$ passing through the virtual constituent point $Q_i$ and the reference curved road constituent point $P_i$ corresponding to the virtual constituent point $Q_i$ and the straight line $P_{i+1}Q_{i+1}$ passing through another virtual constituent point $Q_{i+1}$ adjacent to the virtual constituent point $Q_i$ on the measurement target curved road and the reference curved road constituent point $P_{i+1}$ corresponding to the another virtual constituent point $Q_{i+1}$. The virtual trajectory setting unit 15 acquires, as the virtual trajectory curvature information, the curvature radius $r_i$ that is the distance from the curvature center $O_i$ to the adjacent virtual constituent points $Q_i$, $Q_{i+1}$. Thus, it is possible to acquire the virtual trajectory curvature information of the virtual trajectory $L_x$ using the curvature radius $r_i$ of the arc passing through the adjacent virtual constituent points $Q_i$, $Q_{i+1}$ on the measurement target curved road.

In the map generation system 100, the map generation unit 16 estimates the position of the center line in the lane width direction of the measurement target curved road based on the captured image of the camera 1 provided in the vehicle V traveling on the measurement target curved road, and resets a plurality of measurement target curved road constituent points on the center line. Thus, the plurality of measurement target curved road constituent points is reset on the center line in the lane width direction of the measurement target curved road. Therefore, it is possible to more appropriately acquire the detailed curve information of the measurement target curved road.

[Modifications]

Although the embodiment has been described above, the disclosure is not limited to the above-described embodiment. The embodiment may be implemented in various forms including various modifications and improvements based on the knowledge of those skilled in the art, using the embodiment described above.

For example, in the above-described embodiments, the virtual trajectory setting unit 15 acquires the position of the curvature center $O_i$ of the partial virtual trajectory $L_{xi}$ by finding the intersection of the straight line $P_iQ_i$ and the straight line $P_{i+1}Q_{+1}$ based on the positions of the virtual constituent points $Q_i$, $Q_{i+1}$ adjacent to each other and the positions of the reference curved road constituent points $P_i$ and $P_{i+1}$ respectively corresponding to the virtual constituent points $Q_i$, $Q_{i+1}$. However, the disclosure is not limited to this method. The position of the curvature center $O_i$ of the partial virtual trajectory $L_{xi}$ may be acquired based on the positions of three or more virtual constituent points $Q_i$ including the adjacent virtual constituent points $Q_i$, $Q_{i+1}$.

In the above-described embodiments, the constituent point transfer unit 14 uses the azimuth angle $\theta_i$ for transfer of the virtual constituent point $Q_i$ on the assumption that the virtual constituent point $Q_i$ is located in the direction orthogonal to the tangent at the reference curved road constituent point $P_i$. However, the disclosure is not limited thereto. For example, the transfer of the virtual constituent point $Q_i$ may be performed on the assumption that the virtual constituent point $Q_i$ is located in a direction other than the direction orthogonal to the tangent at the reference curved road constituent point $P_i$. In this case, the virtual constituent point $Q_i$ may be transferred by reflecting the declination angle, at which the other direction is deviated from the direction orthogonal to the tangent, on the azimuth angle $\theta_i$. In addition, for example, the virtual constituent point $Q_i$ may transferred by calculating the position of the virtual constituent point $Q_i$ from the component of the tangent vector at the reference curved road constituent point $P_i$.

In the above-described embodiments, the shape information includes the information of the position of each curved road constituent point of each curved road and the information of the azimuth angle of each curved road constituent point of each curved road. The shape information may include information on the radius of curvature of the arc passing through each of the curved road constituent points of each curved road. In this case, the constituent point transfer unit 14 may specify the position of the virtual constituent point using a curvature radius together with or instead of the azimuth angle. The constituent point transfer unit 14 may specify the positions of the virtual constituent points $Q_i$, $Q_{i+1}$ based on, for example, the curvature radius of the arc passing through the adjacent reference curved road constituent points $P_i$, $P_{i+1}$ and a ratio of the lane width $W_1$ of the reference curved road and the lane width $W_2$ of the measurement target curved road. The curvature information may be used instead of the curvature radius information.

What is claimed is:

1. A map generation system comprising a server configured to:
   transfer a plurality of reference curved road constituent points onto a measurement target curved road as a plurality of virtual constituent points arranged along the measurement target curved road adjacent to a reference curved road, the plurality of reference curved road constituent points being preset in road map information such that the plurality of reference curved road constituent points are arranged along the reference curved road, the reference curved road constituent points being associated with shape information of the reference curved road, and the road map information including first detailed curve information including the shape information of the reference curved road;
   acquire virtual trajectory curvature information, the virtual trajectory curvature information being curvature information of a virtual trajectory extending along the measurement target curved road;
   set the virtual trajectory, based on positions of the plurality of virtual constituent points and the shape information of the reference curved road constituent points respectively corresponding to the plurality of virtual constituent points;
   acquire second detailed curve information of the measurement target curved road by acquiring a plurality of measurement target curved road constituent points arranged at preset intervals from a start point along the measurement target curved road, and associating the virtual trajectory curvature information with each of the plurality of measurement target curved road constituent points, the second detailed curve information being acquired based on a position of the start point of the measurement target curved road preset in the road map information, travel information of a vehicle traveling on the measurement target curved road, and the virtual trajectory curvature information; and
   generate a map by acquiring the second detailed curve information for autonomously controlling an autonomous vehicle.

2. The map generation system according to claim 1, wherein the server is further configured to:
   transfer the reference curved road constituent points as the virtual constituent points onto the measurement target curved road so as to cross a lane mark dividing the reference curved road and the measurement target curved road;
   acquire a position of a curvature center of the virtual trajectory by calculating an intersection of i) a straight line passing through a first virtual constituent point included in the virtual constituent points and a first reference curved road constituent point included in the reference curved road constituent points, the first reference curved road constituent point corresponding to the first virtual constituent point, and ii) a straight line passing through a second virtual constituent point included in the virtual constituent points and adjacent to the first virtual constituent point on the measurement target curved road and a second reference curved road constituent point corresponding to the second virtual constituent point, the second reference curved road constituent point being included in the reference curved road constituent points; and
   acquire the virtual trajectory curvature information using a curvature radius that is a distance from the curvature center to adjacent virtual constituent points.

3. The map generation system according to claim 1, wherein the server is further configured to:
   estimate a position of a center line in a lane width direction of the measurement target curved road based on a captured image of a camera provided in the vehicle traveling on the measurement target curved road; and
   reset the plurality of measurement target curved road constituent points on the center line.

4. The map generation system according to claim 1, wherein an arc representing a portion of the virtual trajectory extending between two adjacent virtual constituent points shares a center point with an arc extending through two reference curved road constituent points that correspond to the two adjacent virtual constituent points.

* * * * *